US007836570B2

(12) United States Patent
Swenson

(10) Patent No.: US 7,836,570 B2
(45) Date of Patent: Nov. 23, 2010

(54) FIXTURE ASSEMBLY AND METHODS RELATED THERETO

(75) Inventor: Jennifer Swenson, Anderson, IN (US)

(73) Assignee: Terronics Development Company, Elwood, IN (US)

( * ) Notice: Subject to any disclaimer, the term of this patent is extended or adjusted under 35 U.S.C. 154(b) by 718 days.

(21) Appl. No.: 11/614,589

(22) Filed: Dec. 21, 2006

(65) Prior Publication Data

US 2008/0149025 A1 Jun. 26, 2008

(51) Int. Cl.
*B23Q 3/00* (2006.01)

(52) U.S. Cl. .................................... 29/281.1; 29/281.6

(58) Field of Classification Search ................ 29/281.1, 29/559, 255, 263; 269/61, 900
See application file for complete search history.

(56) References Cited

U.S. PATENT DOCUMENTS 3,051,124 A * 8/1962 Schlensker et al. .......... 118/503
3,758,098 A * 9/1973 Vrilakas ...................... 269/55
3,923,259 A * 12/1975 Gorsha .................... 241/278.1
3,989,859 A 11/1976 Koerper
4,082,870 A 4/1978 Yenni
5,533,243 A * 7/1996 Asano ....................... 29/25.01
5,992,837 A * 11/1999 Groves ...................... 269/258
6,491,755 B1 12/2002 Meinke
6,709,712 B2 3/2004 Chappa et al.
6,743,462 B1 6/2004 Pacetti
2003/0134731 A1 * 7/2003 Komine ...................... 483/27
2003/0211230 A1 11/2003 Pacetti et al.
2004/0056400 A1 * 3/2004 Ghuman et al. ............... 269/71
2008/0149025 A1 * 6/2008 Swenson .................... 118/308
2009/0056630 A1 * 3/2009 Hester et al. ................ 118/730

OTHER PUBLICATIONS

"International Application Serial No. PCT/US2007/26041, International Search Report mailed May 15, 2008", P220, 7 pgs.
"International Application Serial No. PCT/US2007/26041, Written Opinion mailed May 15, 2008", P237, 6 pgs.
"International Application Serial No. PCT/US2007/26041, Search Report mailed May 20, 2008", P220, 7 pgs.
"International Application Serial No. PCT/US2007/26041, Written Opinion mailed May 20, 2008", P237, 5.

* cited by examiner

*Primary Examiner*—Lee D Wilson
(74) *Attorney, Agent, or Firm*—Clise, Billion & Cyr, P.A.; Benjamin Armitage

(57) ABSTRACT

Embodiments of the invention relate to a fixture assembly comprising one or more cartridge assemblies, each cartridge assembly comprising one or more part-holders surrounding a driveshaft and supporting a target. The fixture assembly also includes a base assembly in contact with the one or more cartridge assemblies and wherein each cartridge assembly and each part-holder can independently rotate during a contacting process.

19 Claims, 5 Drawing Sheets

FIXTURE ASSEMBLY AND METHODS RELATED THERETO

TECHNICAL FIELD

Embodiments of the present invention relate to a fixture assembly for supporting a target during a contacting process. More specifically, embodiments relate to a fixture assembly capable of rotating and/or indexing a target for electrostatic deposition.

BACKGROUND

Electrohydrodynamic spraying equipment is typically used to apply an electrically non-(or low) conductive material to a conductive target which is electrically grounded. The target is usually supported in some manner that does not require any customized holding fixture, so long as electrical ground is made. However, some targets are very small, difficult to hold and to ground. In typical electrostatic deposition processes, the target is coated with only a small percentage of the material being deposited, creating an inefficient process with significant waste. When using expensive coating materials, such as drugs, this inefficiency in coating can be very costly. Inefficiencies in coating also apply to other contacting processes, such as spray coating and powder coating, for example.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

SUMMARY

Figure 1:
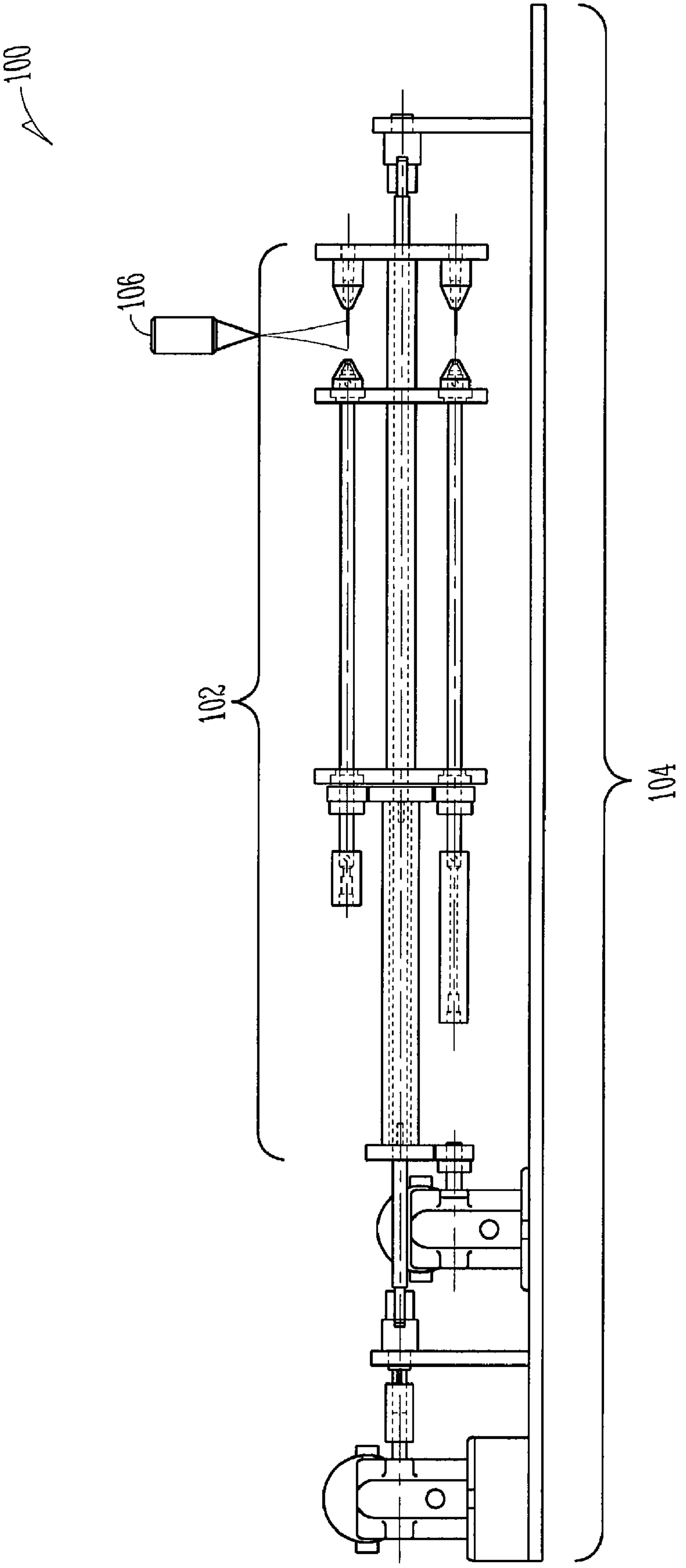
FIG. 1 illustrates a cross-sectional view of a fixture assembly for a contacting process, according to some embodiments.

Embodiments of the invention relate to a fixture assembly comprising one or more cartridge assemblies, each cartridge assembly comprising one or more part-holders surrounding a driveshaft and supporting a target. The fixture assembly also includes a base assembly in contact with the one or more cartridge assemblies and wherein each cartridge assembly and each part-holder can independently rotate during a contacting process. Embodiments also relate to a method of using a fixture assembly for a contacting process. The method comprises fixing one or more targets to or within one or more of part-holders of one or more cartridge assemblies, introducing a coating material to one or more nozzles positioned near the fixture assembly and contacting the one or more targets with the coating material by a contacting process, wherein the one or more cartridge assemblies in contact with the base of the fixture assembly allow the one or more targets to rotate, index or both during the contacting process.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

In this document, the terms "a" or "an" are used to include one or more than one and the term "or" is used to refer to a nonexclusive or unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Embodiments of the invention relate to a fixture assembly for supporting a target during a contacting process. Examples of a contacting process include spray coating and electrostatic deposition, for example. Embodiments of the fixture assembly allow for targets to be rotated and indexed during the contacting process. The fixture assembly may comprise one or more cartridge assemblies that can be easily removed for cleaning or for preparing another batch of targets to be contacted, such as by coating. The fixture assembly of the embodiments of the present invention allows for the targets to be coated efficiently, in shorter time and with less waste of the coating material.

Figure 2:
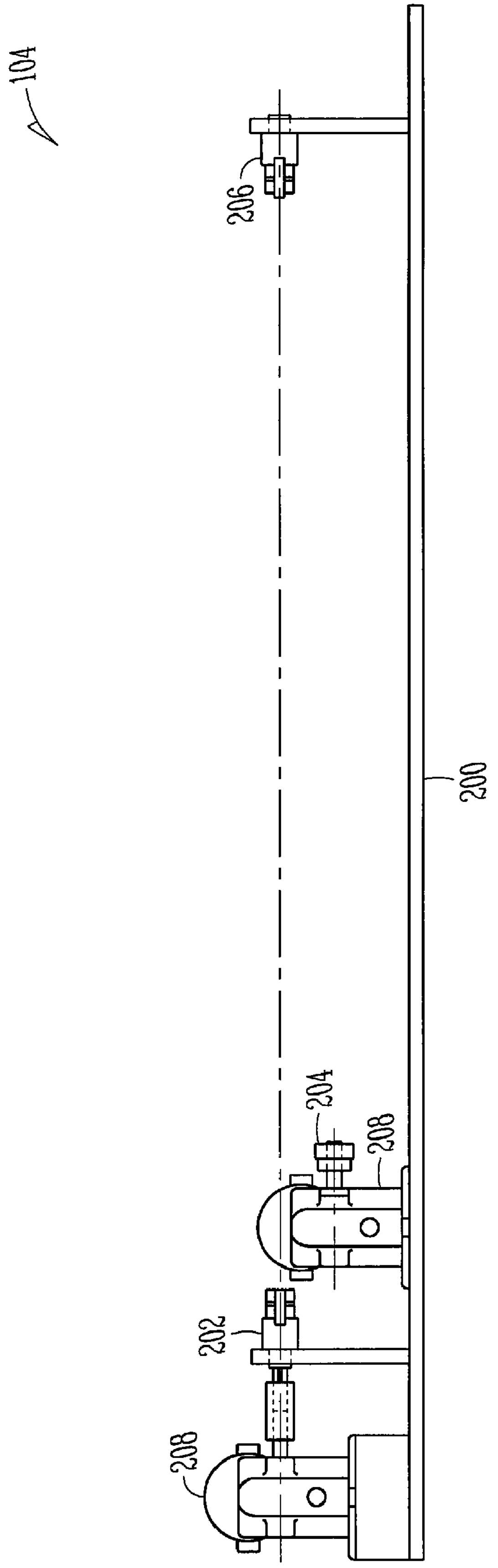
FIG. 2 illustrates a cross-sectional view of a base assembly, according to some embodiments.

Referring to FIG. 1, a cross-sectional view of a fixture assembly 100 for a contacting process is shown, according to some embodiments. The fixture assembly 100 comprises one or more cartridge assemblies 102 in contact with a base assembly 104. One or more nozzles 106 may be positioned so as to deliver a coating material to a target, as in a contacting process. Examples of a contacting process include spray coating, electrostatic deposition and powder coating. In FIG. 2, a cross-sectional view of a base assembly 104 is shown, according to some embodiments. The base assembly 104 may be adapted to hold or be in contact with one or more of the cartridge assemblies 102. The base assembly 104 comprises a base 200 in which two or more spindles may be attached to or formed as part of the base 200, such as a drive side spindle 202 and a free side spindle 206. One or more drive motors 208 may be attached to the base 200 near the drive side spindle 202, for example. One or more drive gears 204 are powered by the one or more drive motor 208.

The base assembly 104 may be in contact with more than one cartridge assembly 102. The base assembly 104 may index the cartridge assemblies 102 linearly or by rotating them, for example. The one or more drive motors 208 may be attached to the base 200, but also can be independently positioned, so long as the one or more drive gears 204 are in contact with the one or more drive tube gears 302 of the cartridge assemblies 102 (see FIG. 3A).

Figure 3A:
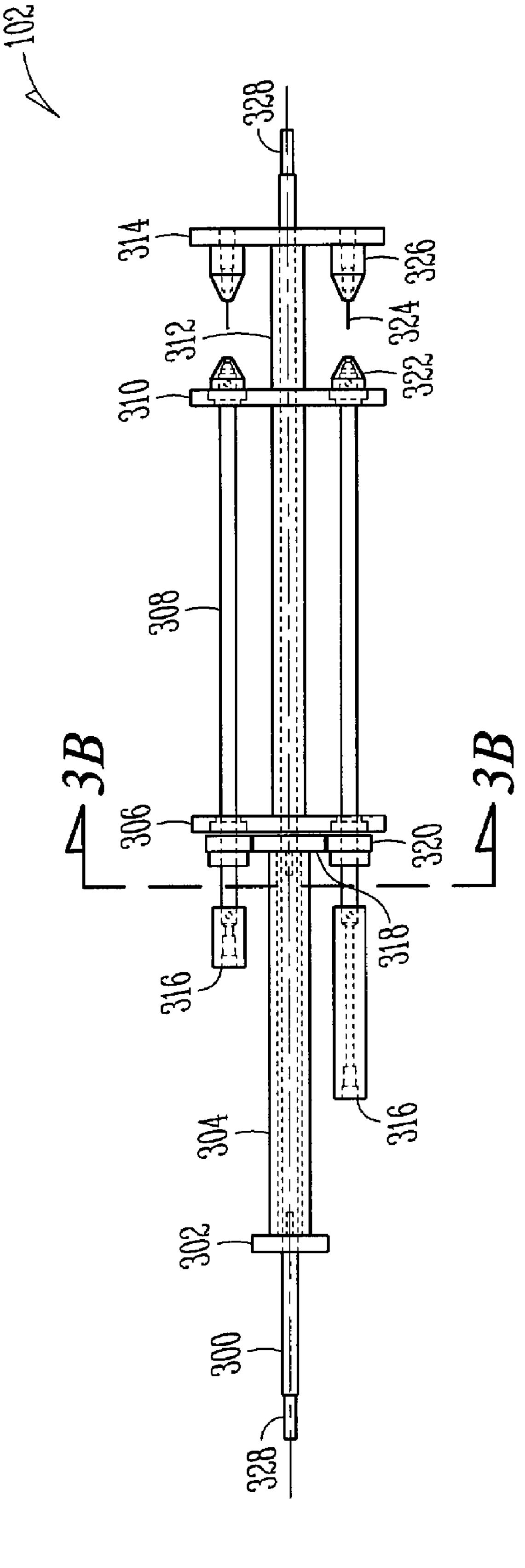
FIG. 3A illustrates a cross-sectional view of a cartridge assembly, according to some embodiments.

Referring to FIG. 3A, a cross-sectional view of a cartridge assembly 102 is shown, according to some embodiments. A driveshaft 300 may form the axis for the cartridge 102. The cartridge assembly 102 may comprise one or more part-holders surrounding a driveshaft 300. The one or more part-holders may include at least one of two or more bulkheads, a drive tube 304, one or more drive tube gears 302, one or more outer drive tubes 308, one or more part-holding attachments 316, one or more planetary gears 320, a sun gear 318, one or more covers 322, one or more centering guides 326 or one or more ground wires 324.

Figure 3B:
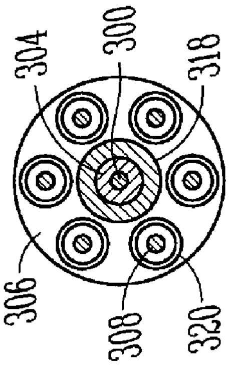
FIG. 3B illustrates a cross-sectional view along line 3B-3B of FIG. 3A, according to some embodiments.

The driveshaft 300 may be attached to or pass through two or more bulkheads and may be optionally surrounded by a drive tube 304. The bulkheads may include a drive side bulkhead 306, intermediate bulkhead 310 and ground side bulkhead 314, for example. The bulkheads may support one or more outer drive tubes 308, which run parallel to the drive shaft 300. The drive tube 304 may independently rotate around driveshaft 300 to rotate the one or more of the outer drive tubes 308. One or more part-holding attachments 316 may be coupled to the one or more outer drive tubes 308 and may be positioned near or at the end of the outer drive tubes 308 which is closest to the sun gear 318. One or more planetary gears 320 may be supported by the outer drive tubes 308, for example. The outer drive tubes 308 may be supported by the bulkheads, for example. A sun gear 318 may be supported by the driveshaft 300 and/or drive tube 304 and in contact with the one or more planetary gears 320. FIG. 3B shows a cross-sectional view along the line 3B-3B in FIG. 3A.

One or more covers 322 may be positioned at the opposite end of the one or more outer drive tubes 308 in which the one or more part-holding attachments 316 are located. The one or more covers 322 may be electrically insulative so as to not attract any electrically charged spray away from the target, for example. One or more centering guides 326 may be in contact with at least one of the bulkheads and facing the one or more covers 322. Protruding from the one or more centering guides 326 may be one or more ground wires 324. The ground wires 324 may be electrically grounded. The ground wires 324 may contact a target during the contacting process, which may ground the target. By grounding the target, any charged spray may be attracted to the target during a contacting process. The centering guides 326 support the ground wires 324 by aligning them across from the covers 322. An insulative shield 312 may surround the driveshaft 300 between the intermediate bulkhead 310 and ground side bulkhead 314 to prevent the driveshaft 300 from interfering with the contacting of one or more targets. The insulative shield 312 may be comprised of a material that is electrically insulative so as to not attract any charged spray being directed to a target, for example. Coupling mechanisms 328 may be positioned at the ends of the drive shaft 300.

The one or more cartridge assemblies 102 may be in contact with the base assembly 104 by the driveshaft 300 coupling with the spindles of the base assembly 104. The coupling mechanisms 328 may be quick-coupling mechanisms which allow the cartridge assemblies 102 to be easily and quickly removed from the base assembly 104. While removed, the cartridge assemblies 102 may be cleaned or re-loaded with targets, for example.

One or more targets may be held by the part-holding attachments 316 within the one or more outer drive tubes 308 and protrude from the one or more covers 322. The part-holding attachments 316 may be of differing sizes or lengths, across different cartridge assemblies 102 or within the same cartridge assembly 102, depending on the needs of the target. Examples of targets may be stents on catheters, mechanical parts, medical devices and electronic components or combinations thereof. Each cartridge assembly 102 may comprise one or more outer drive tubes 308. For example, one cartridge assembly 102 may comprise six outer drive tubes 308, coupled to six part-holding attachments 316, six covers 322, etc.

The covers 322 may be conically shaped, for example. Because the target protrudes from the cover 322, a conical shape may reduce surface area exposed to deposition around the target.

The one or more targets may be independently rotated, indexed or both during the contacting process. The one or more drive motors 208 may power the drive gear 204, which is in contact with the drive tube gear 302 of the cartridge assembly 102, or power the driveshaft 300. As the drive tube gear 302 is turned, the attached drive tube 304 rotates. The sun gear 318 coupled to the drive tube 304 may also rotate. As the sun gear 318 turns it contacts the planetary gears 320 which rotate the coupled outer drive tubes 308, thus rotating the targets. If one of the drive motors 208 is coupled to the driveshaft 300, the entire cartridge assembly 102 may index.

Figure 4:
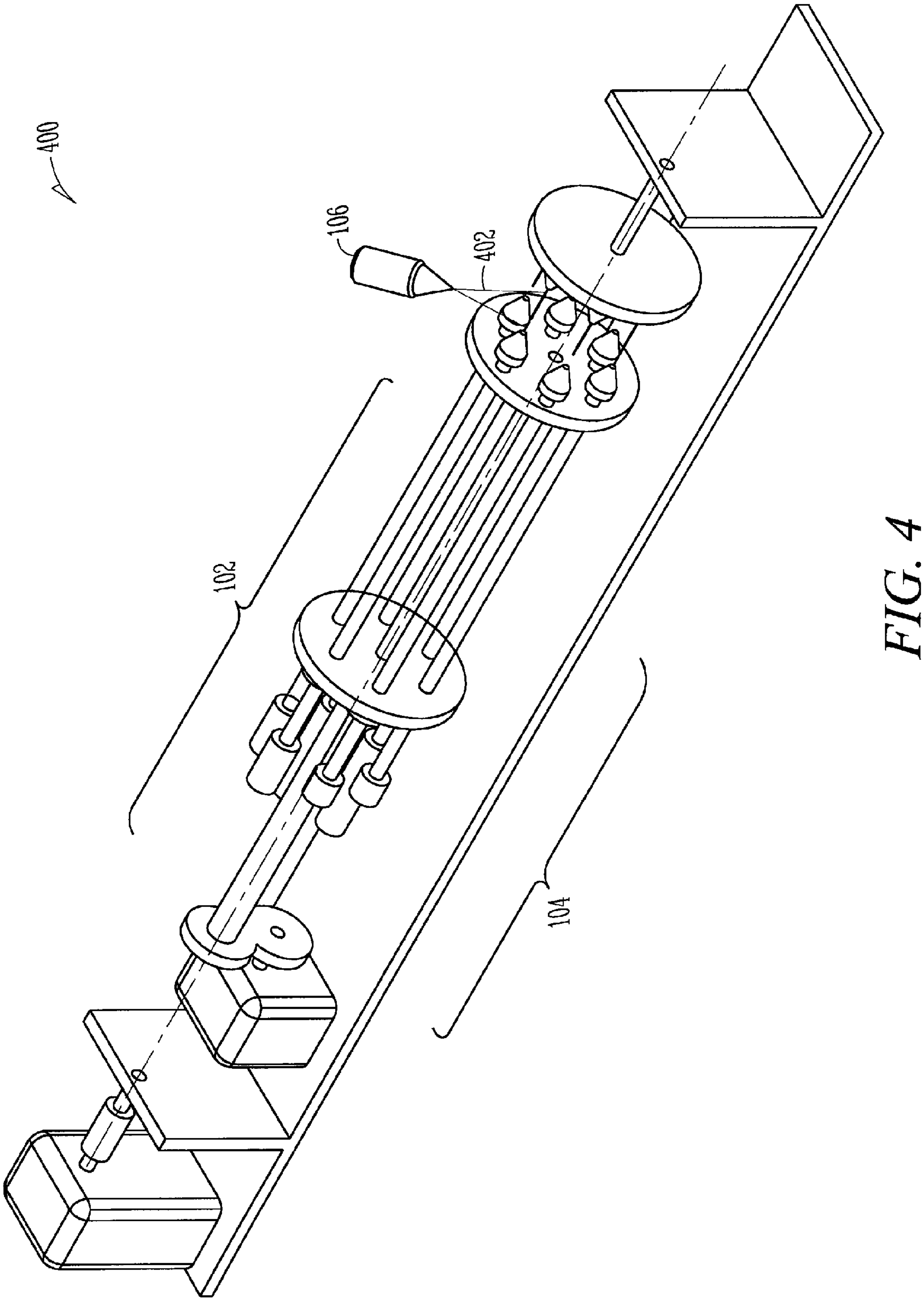
FIG. 4 illustrates a perspective view of a fixture assembly for a contacting process, according to some embodiments.

Referring to FIG. 4, a perspective view of a fixture assembly system 400 for a contacting process is shown, according to some embodiments. The fixture assembly 100 comprises one or more cartridge assemblies 102 in contact with a base assembly 104. One or more nozzles 106 may be positioned so as to deliver a coating material 402 to a target, such as during a contacting process. For example, the nozzles 106 may be electrostatic deposition nozzles as disclosed in commonly owned U.S. Pat. No. 5,165,601 and U.S. patent application Ser. No. 11/426,180, both disclosures of which are incorporated by reference in their entirety.

Figure 5:
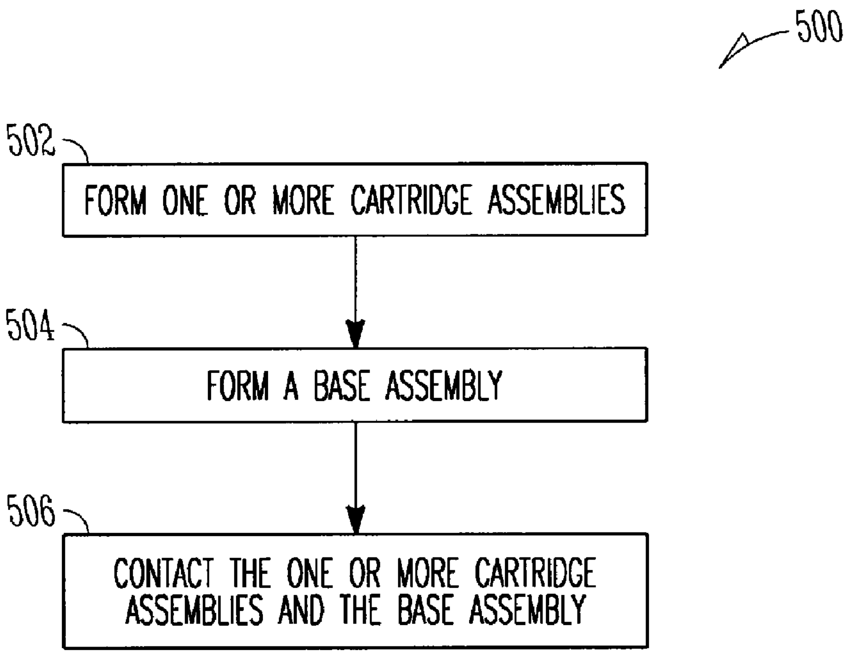
FIG. 5 illustrates a block flow diagram of a method of making a fixture assembly for a contacting process, according to some embodiments.

Referring to FIG. 5, a block flow diagram of a method 500 of making a fixture assembly for a contacting process is shown, according to some embodiments. One or more cartridge assemblies may be formed 502. A base assembly may be formed 504. The one or more cartridge assemblies may be contacted 506 by the base assembly to form a fixture assembly for a contacting process.

Figure 6:
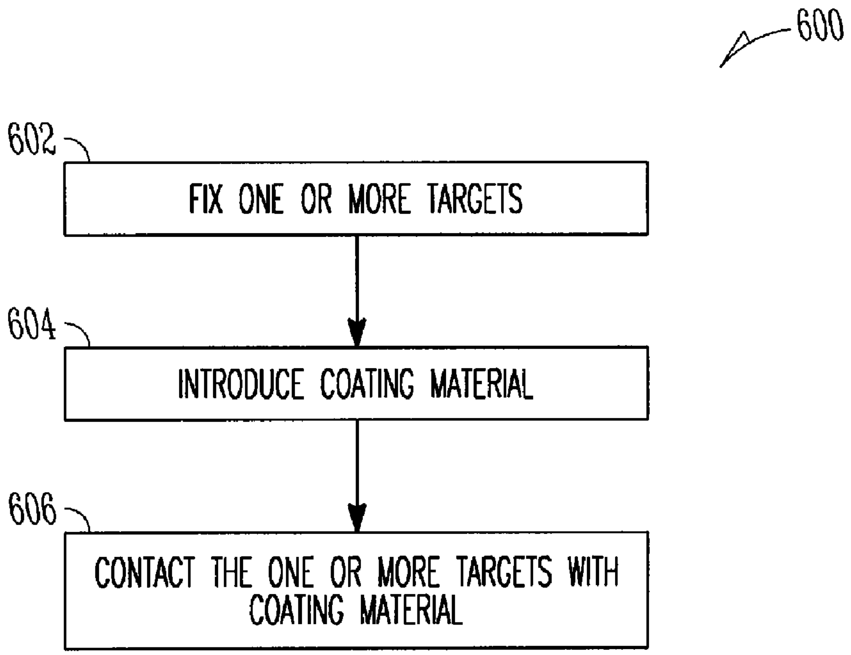
FIG. 6 illustrates a block flow diagram of a method of using a fixture assembly for a contacting process, according to some embodiments.

Referring to FIG. 6, a block flow diagram of a method 600 of using a fixture assembly for a contacting process is shown, according to some embodiments. One or more targets may be fixed 602 to or within one or more of the part-holding attachments, outer drive tubes, or covers of a fixture assembly. A coating material may be introduced 604 to one or more nozzles positioned near the fixture assembly. The one or more targets may be contacted 606 with the coating material by a contacting process, such as electrostatic deposition. The one or more targets may be rotated, indexed or both during the contacting process.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A fixture assembly comprising:

one or more cartridge assemblies each having a driveshaft passing through an aperture in and in contact with one or more support bulkheads, each cartridge assembly including:

one or more part-holders having a target-holding mechanism and independent rotating drive tube supported by the one or more bulkheads and surrounding the driveshaft; and a base assembly, in contact with and supporting the one or more cartridge assemblies;

wherein each cartridge assembly rotates by turning the driveshaft and each part-holder independently rotates by turning the drive tube during a contacting process.

2. The fixture assembly of claim 1, wherein the one or more cartridge assemblies are removable from the base assembly.

3. A fixture assembly comprising, one or more cartridge assemblies, each cartridge assembly comprising:

one or more part-holders, surrounding a driveshaft and supporting a target; and a base assembly, in contact with the one or more cartridge assemblies;

wherein each cartridge assembly and each part-holder can independently rotate during a contacting process; and wherein the one or more part-holders includes at least one of two or more bulkheads, a drive tube, one or more drive tube gears, one or more outer drive tubes, one or more part-holding attachments, one or more planetary gears, a sun gear, one or more covers, one or more centering guides or one or more ground wires.

4. The fixture assembly of claim 3, wherein the two or more bulkheads comprise a drive side bulkhead supporting the one or more outer drive tubes positioned near the sun gear, an intermediate bulkhead supporting the one or more outer drive tubes positioned near the covers and a ground side bulkhead positioned near the centering guides.

5. The fixture assembly of claim 4, further comprising an insulative shield surrounding the driveshaft between the intermediate bulkhead and ground side bulkhead.

6. The fixture assembly of claim 3, further comprising one or more release mechanisms positioned at the ends of the driveshaft.

7. The fixture assembly of claim 3, wherein the part-holding attachments are of differing sizes.

8. The fixture assembly of claim 3, wherein the one or more outer drive tubes comprises six outer drive tubes.

9. The fixture assembly of claim 3, wherein the number of outer drive tubes, planetary gears, covers, ground wires, centering guides, and part-holding attachments are the same.

10. A fixture assembly comprising:

one or more cartridge assemblies, each cartridge assembly comprising:

two or more bulkheads;

a driveshaft, in contact with the central portion of the two or more bulkheads;

a drive tube, surrounding the driveshaft;

one or more drive tube gears, in contact with the drive tube;

one or more outer drive tubes, supported by at least one of the two or more bulkheads;

one or more part-holding attachments, positioned at or near the end of the one or more outer drive tubes;

one or more planetary gears, in contact with the one or more outer drive tubes;

a sun gear, in contact with the drive tube and the one or more planetary gears;

one or more covers, positioned at the opposite end of the one or more outer drive tubes in which the partholding attachment is located;

one or more centering guides, in contact with at least one of the bulkheads and facing the one or more covers;

one or more ground wires, protruding from the one or more centering guides and in contact with the driveshaft;

wherein one or more targets are held by the part-holding attachment within the one or more outer drive tubes and protrude from the one or more covers; and a base assembly, the base assembly comprising:

a base;

two or more spindles, attached to the base and in contact with the driveshaft of the cartridge assembly;

one or more drive motors, attached to the base;

one or more drive gears, attached to the one or more drive motors and in contact with the one or more drive tube gears of the cartridge assembly;

wherein the one or more cartridge assemblies are removable from the base.

11. A cartridge assembly comprising:

one or more part-holders having a target-holding mechanism and independent rotating drive tube surrounding a driveshaft; and wherein the target-holding mechanism is positioned at or near an end of the rotating drive tube and wherein each cartridge assembly rotates by turning the driveshaft and each part-holder independently rotates by turning the drive tube during a contacting process.

12. The cartridge assembly of claim 11, wherein the one or more part-holders includes at least one of two or more bulkheads, a drive tube, one or more drive tube gears, one or more outer drive tubes, one or more part-holding attachments, one or more planetary gears, a sun gear, one or more covers, one or more centering guides or one or more ground wires.

13. The assembly of claim 12, wherein the two or more bulkheads comprise a drive side bulkhead supporting the one or more outer drive tubes positioned near the sun gear, an intermediate bulkhead supporting the one or more outer drive tubes positioned near the covers and a ground side bulkhead positioned near the centering guides.

14. The cartridge assembly of claim 13, further comprising an insulative shield surrounding the driveshaft between the intermediate bulkhead and ground side bulkhead.

15. The cartridge assembly of claim 12, further comprising one or more release mechanisms positioned at the ends of the driveshaft.

16. The cartridge assembly of claim 12, wherein the part-holding attachments are of differing sizes.

17. The cartridge assembly of claim 12, wherein the one or more outer drive tubes comprises six outer drive tubes.

18. The cartridge assembly of claim 12, wherein the number of outer drive tubes, planetary gears, covers, ground wires, centering guides, and part-holding attachments are the same.

19. The cartridge assembly of claim 11, wherein the target comprise a stent on a catheter, a mechanical part, a medical device, an electronic component or a combination thereof.

* * * * *